United States Patent
Darbyshire et al.

(10) Patent No.: US 10,137,991 B2
(45) Date of Patent: Nov. 27, 2018

(54) TRAY TABLE DEPLOYABLE FROM LOWER SEATBACK AREA

(71) Applicant: B/E Aerospace, Inc., Wellington, FL (US)

(72) Inventors: Martin Darbyshire, London (GB); Vien McArthur Nguyen, London (GB); Cameron Baker, London (GB); Lucas Tretout, London (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/478,333

(22) Filed: Apr. 4, 2017

(65) Prior Publication Data

US 2017/0283067 A1 Oct. 5, 2017

Related U.S. Application Data

(60) Provisional application No. 62/317,937, filed on Apr. 4, 2016.

(51) Int. Cl.
*B64D 11/06* (2006.01)

(52) U.S. Cl.
CPC .............................. *B64D 11/0638* (2014.12)

(58) Field of Classification Search
CPC .................................................. B64D 11/0638
USPC ........................... 108/44, 152; 297/146, 144
See application file for complete search history.

(56) References Cited

U.S. PATENT DOCUMENTS

| | | | | |
|---|---|---|---|---|
| 889,526 A * | 6/1908 | James | ............... | B64D 11/0638 |
| | | | | 297/146 |
| 1,790,468 A * | 1/1931 | Frank et al. | ............. | A47C 7/70 |
| | | | | 108/117 |
| 1,809,866 A * | 6/1931 | Riesche | ................... | A47B 5/04 |
| | | | | 108/116 |
| 2,963,078 A * | 12/1960 | Ferrelle | ................. | B60N 3/004 |
| | | | | 108/38 |
| 3,773,381 A * | 11/1973 | Brennan | ................. | A47C 7/70 |
| | | | | 108/45 |
| 5,140,914 A * | 8/1992 | Bohbot | .................... | A47C 7/70 |
| | | | | 108/152 |
| 6,308,641 B1 * | 10/2001 | Kingbury | ................ | A47B 5/04 |
| | | | | 108/42 |
| 6,758,518 B2 * | 7/2004 | Ingram | .................. | B60N 3/004 |
| | | | | 108/44 |
| 6,761,398 B2 * | 7/2004 | Bentley | .................... | B60N 2/22 |
| | | | | 297/146 |
| 7,721,657 B2 * | 5/2010 | Carstensen | ............ | A47B 5/006 |
| | | | | 108/134 |

(Continued)

*Primary Examiner* — Jose V Chen
(74) *Attorney, Agent, or Firm* — Clements Bernard Walker PLLC

(57) ABSTRACT

In an illustrative embodiment, a tray table for mounting to a lower seatback region of an aircraft passenger seat includes a tray table support bracket stowable to a position approximately parallel with the lower seatback region, and pivotably deployable to provide access to a tray table slideably coupled to the support bracket and configured to provide a substantially horizontal work surface when in a deployed state. In the stowed position, the tray table may be substantially positioned below a tray table deployment height such that additional clearance is provided on the seatback above the tray table for one or more accessory items such as a larger monitor in portrait orientation.

7 Claims, 16 Drawing Sheets

(56) References Cited

U.S. PATENT DOCUMENTS

| | | | | |
|---|---|---|---|---|
| 8,205,563 B2* | 6/2012 | St. Louis | ............... | B64D 11/00 |
| | | | | 108/40 |
| 8,997,660 B2* | 4/2015 | Satterfield | ............... | A47B 31/06 |
| | | | | 108/44 |
| 2006/0075934 A1* | 4/2006 | Ram | ................. | B60N 3/004 |
| | | | | 108/44 |
| 2011/0187163 A1* | 8/2011 | Westerink | ............... | B60N 3/004 |
| | | | | 297/163 |
| 2015/0061327 A1* | 3/2015 | Millan | ................... | B60N 3/004 |
| | | | | 297/163 |
| 2016/0152169 A1* | 6/2016 | Zheng | ................ | B64D 11/0636 |
| | | | | 297/163 |
| 2016/0332550 A1* | 11/2016 | Stewart | ............... | B64D 11/0638 |
| 2017/0036766 A1* | 2/2017 | Dall'Era | ............ | B64D 11/0647 |
| 2017/0071375 A1* | 3/2017 | Smith | ................... | A47G 11/004 |
| 2017/0088269 A1* | 3/2017 | Matsuda | ............ | B64D 11/0015 |
| 2017/0355465 A1* | 12/2017 | Trimble | ............. | B64D 11/0638 |

\* cited by examiner

TRAY TABLE DEPLOYABLE FROM LOWER SEATBACK AREA

RELATED APPLICATIONS

This application claims priority to U.S. Provisional Patent Application Ser. No. 62/317,937, entitled "Aircraft Passenger Seat with Tray Table Deployable from Lower Seatback Area," filed Apr. 4, 2016, hereby incorporated by reference in its entirety. This application incorporates by reference, in their entirety, the following patent applications by B/E Aerospace, Inc. directed to passenger tray tables: U.S. patent application Ser. No. 15/097,361, entitled "Deployable Dining Table," filed Apr. 13, 2016; U.S. Pat. No. 9,573,687 entitled "Laterally-Expanding Tray Table," issued Feb. 21, 2017; U.S. Pat. No. 8,979,189, entitled "Cantilevered Tray Table and Aircraft Passenger Suite Including the Same," issued Mar. 17, 2015; U.S. patent application Ser. No. 14/955,332 entitled "Passenger Seat with Full Seatback Video Display" and filed Dec. 1, 2015; and U.S. Provisional Application No. 62/480,818 entitled "Passenger Tray Table" and filed Apr. 3, 2017. All above identified applications are hereby incorporated by reference in their entireties.

BACKGROUND

Conventionally, passenger seatback mounted tray tables mount to a mid-back range of the fore positioned passenger seat, while a headrest region may be reserved for a display monitor. To use the tray table, the passenger releases a latch maintaining the tray table against the passenger seatback, and the tray table hinges downward into the deployed position. Thus, the conventional passenger seatback mounted tray table requires a stowage footprint in the mid-back region of fore positioned passenger seat of substantially the width of the mid-back of the passenger seat by a height of around three-quarters of the width of the mid-back of the passenger seat. Beneath the mounting position of the tray table, a seat pocket is typically mounted, containing a safety pamphlet as well as an in-flight magazine or other airline marketing materials (e.g., listing of available entertainment, listing of available menu, etc.).

The inventors recognized a need for a different mounting of the passenger tray table, providing greater real estate upon the upper seatback and head rest region for a larger monitor mounting position.

SUMMARY OF ILLUSTRATIVE EMBODIMENTS

In an illustrative embodiment, a tray table for mounting to a lower seatback region of an aircraft passenger seat includes a tray table support bracket stowable to a position approximately parallel with the lower seatback region, and pivotably deployable to provide access to a tray table slideably coupled to the support bracket and configured to provide a substantially horizontal work surface when in a deployed state. In the stowed position, the tray table may be substantially positioned below a tray table deployment height such that additional clearance is provided on the seatback above the tray table for one or more accessory items such as a larger monitor in portrait orientation.

The tray table support bracket may include a lateral base member, and at least one support arm having a proximal end configured to pivotably couple to the lateral base member. The at least one support arm may be operable to pivot between a stowed position in which a distal end of the at least one support arm is oriented to be substantially parallel to the seatback, and a deployed position in which the distal end of the at least one support arm is displaced away from the seatback. The support bracket may include at least one guide member extending between the distal end and the proximal end of the at least one support arm. A tray table may be coupled to the support bracket and configured to provide a substantially horizontal work surface when in a deployed state, the tray table including a rear edge in a slidable engagement relationship with the at least one guide member. The tray table may be configured to engage in rotatable coupling with the at least one support arm about a lateral axis of rotation when the rear edge of the tray table is raised along the at least one guide member to the proximal end of the at least one support arm. In the stowed position, a majority of the tray table may be positioned below a deployment height of the tray table.

In certain embodiments, a telescoping tray table may include a rocking latch that retains a slidable table portion in the retracted position while stowed until the table is partially deployed by being extended upwards and rotated to a substantially horizontal orientation for use. In an example, the slidable table portion may be formed as an inner table portion slidably engaged to an outer table portion. During transition from stowed mode to deployed mode, a biased member may actuate the rocking latch to displace a capture end of the rocking latch away from a locking position. When the capture end of the rocking latch is actuated into the unlocked position, the inner table portion may freely slide relative to the outer table sleeve. Some embodiments may advantageously prevent inadvertent extension of the inner table portion when the table is in the stowed position.

Various embodiments may achieve one or more advantages. For example, some embodiments may employ a collapsible table, which may automatically unlatch telescoping table segments, and open to a larger table surface once the table is hinged into a horizontal position. In some examples, the low stowage position of the collapsible table opens the upper area of the seatback to employment of an upgraded display technology. Users may experience a higher quality passenger experience through the upgraded display technology. In some examples, aircraft cabin interior designers may employ an upgraded display technology without the need for a certified test for acceptable head injury criteria ("HIC"). Some embodiments may automatically unlock the inner table portion to permit extension if the table is partially deployed and oriented in a horizontal plane. Some embodiments may be configured to automatically recapture the inner table portion in the stowed state if the table is oriented out of the horizontal plane, such as when it is stowed against the back of the aircraft passenger seat, for example.

The foregoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1A:
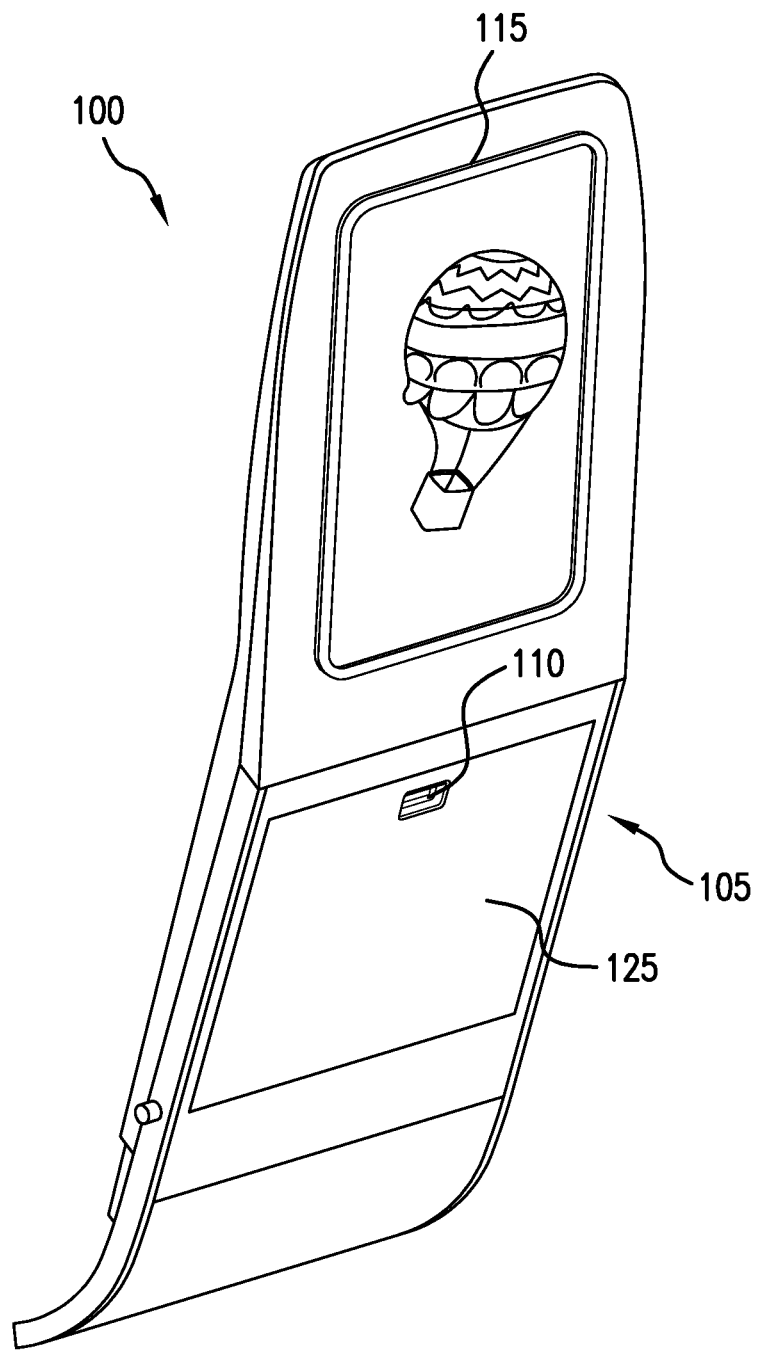
FIG. 1A depicts a perspective view of an aircraft seatback illustrating a low positioning of an exemplary tray table.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Conventionally, passenger seatback mounted tray tables mount to a mid-back range of the fore positioned passenger seat, while a headrest region may be reserved for a display monitor. To use the tray table, the passenger releases a latch maintaining the tray table against the passenger seatback, and the tray table hinges downward into the deployed position. Thus, the conventional passenger seatback mounted tray table requires a stowage footprint in the mid-back region of fore positioned passenger seat of substantially the width of the mid-back of the passenger seat by a height of around three-quarters of the width of the mid-back of the passenger seat. Beneath the mounting position of the tray table, a seat pocket is typically mounted, containing a safety pamphlet as well as an in-flight magazine or other airline marketing materials (e.g., listing of available entertainment, listing of available menu, etc.).

By removing the seatback pocket and lowering the tray table mount in the general position previously occupied by the seatback pocket, the upper region of the seatback may be freed up to allocate real estate to additional purposes, such as an enlarged display monitor. For example, rather than hinging downward to a deployed position, in illustrative embodiments, the current disclosure relates to seatback tray table mountings which stow fully or substantially beneath the deployment height of the tray table.

FIG. 1A depicts a perspective view of an aircraft seatback illustrating a low positioning of an exemplary tray table in a stowed position. An aircraft passenger seat 100 includes a table assembly 105. The table assembly 105 may include an integrated release mechanism 110. The table assembly 105 may be hingedly coupled to the back of the aircraft passenger seat 100 at approximately a position conventionally used for positioning a seatback reading materials pocket.

A display 115 is coupled to the upper portion of the back of the aircraft seat 100, The display 115 may he mounted in an enclosure or housing which is in turn rigidly coupled to a seatback shroud, shell, or frame (not shown). The display may be mounted in a corresponding recess or aperture in the seatback frame, shell or shroud.

In operation, the table assembly 105 stows into a low position on the back of the aircraft passenger seat 100, which may advantageously allow for a display 115 that is larger, due to the larger available area above the foldaway table assembly 105. As illustrated, the display is arranged in a generally portrait view rather than a conventional landscape view. For example, the display 115 may have a width substantially similar to a width of a conventional seatback display (e.g., most of the width of the upper seatback of the passenger seat), but the height may be increased, in some examples, by at least one quarter, by at least one third, about doubled, or over doubled in height in comparison to a conventional seatback display arranged in landscape viewing mode. In some examples, the display 115 may be at least 17 inches diagonal, between 18 and 21 inches diagonal, or over 21 inches diagonal. In certain embodiments, the display 115 is at least 12, 13, 14, 15, 16, 17, 18, 19, 20, 21, 22, 23 or 24 inches diagonal.

In some implementations, a tray table 125 of the table assembly 105, in a stowed position, mounts parallel to the lower seatback of the passenger seat in its full table width and height. In other implementations, the tray table 125 visible in the stowed position is a portion of a full span of the tray table. For example, the tray table 125 may be substantially half of the full span of the tray table portion in a telescoping or folding tray table embodiment.

In some implementations, the enlarged display 115 replaces materials previously stored in the seat pocket. For example, the enlarged display 115 may include passenger menu options for reviewing flight safety information of the aircraft, available menu items, available programming options, and/or other airline marketing materials, such as e-reading versions of an in-flight magazine, terminal maps of a destination airport, flight maps of the airline's flight paths, and an in-flight shopping catalog such as a duty free catalog or a SkyMall shopping catalog by Skymall Holdings LLC of Edison, N.J.

Figure 1B:
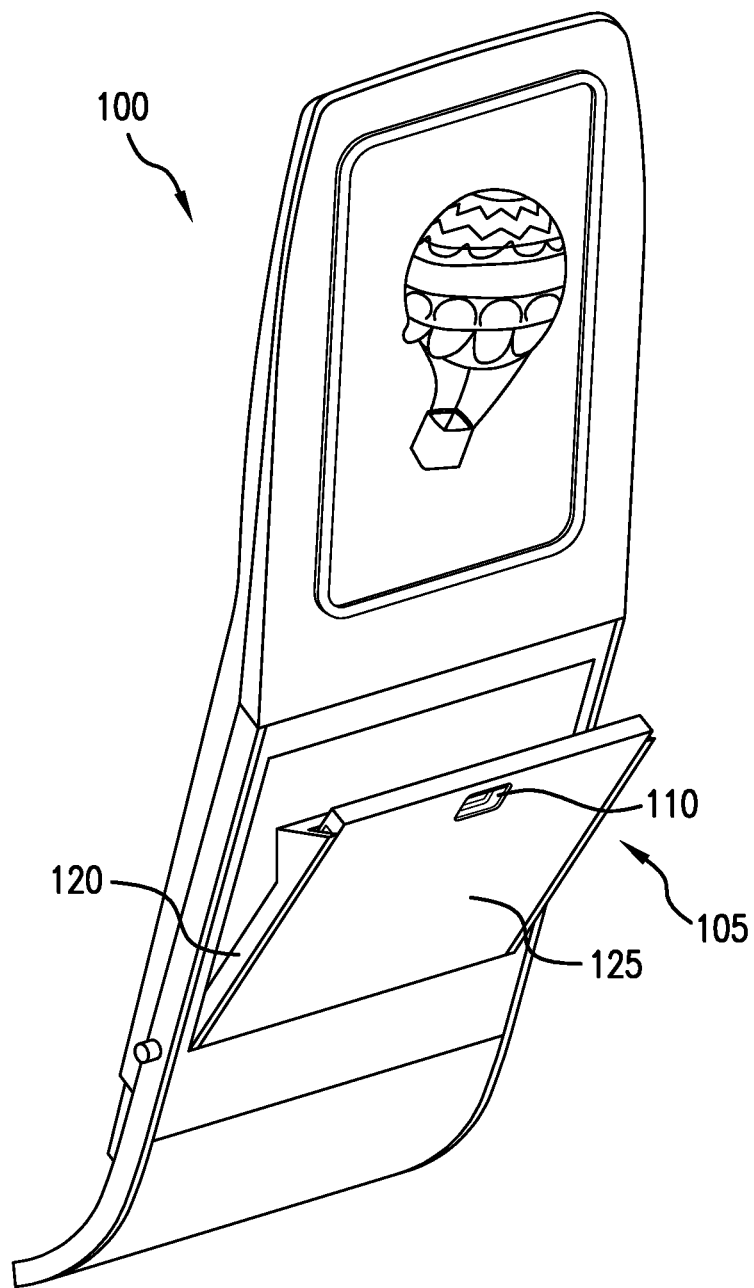
FIG. 1B depicts a perspective view of an aircraft seatback illustrating initial deployment of an exemplary tray table.

FIG. 1B depicts a perspective view of an aircraft seatback illustrating an initial deployment position of the table assembly 105. The table assembly 105, as illustrated, is hingedly coupled to the back of the aircraft passenger seat 100. For example, the table assembly 105 may be hingedly coupled to the passenger seatback 100 through a table support bracket 120. In operation, the foldaway table assembly 105 may be released from the back of the aircraft seat 100 by actuating the release mechanism 110. The release mechanism, in one example, may be a push button mechanism that releases a latch connection with the passenger seatback. In another example, the release mechanism may be a pull handle configured to overcome a friction lock mechanism maintaining the table assembly 105 in the stowed position. Gravity may move the table support bracket 120 into deployed position upon actuation of the release mechanism 110 (e.g., upon pressing a release button). A spring assist, in a further example, may aid in moving the table support bracket 120 into deployed position. Conversely, in the circumstance of a handle, the passenger may manually pull the table support bracket 120 into deployed position. In the initial deployment position, as illustrated, the released foldaway table assembly 105 hinges away from the aircraft passenger seat 100.

Figure 1C:
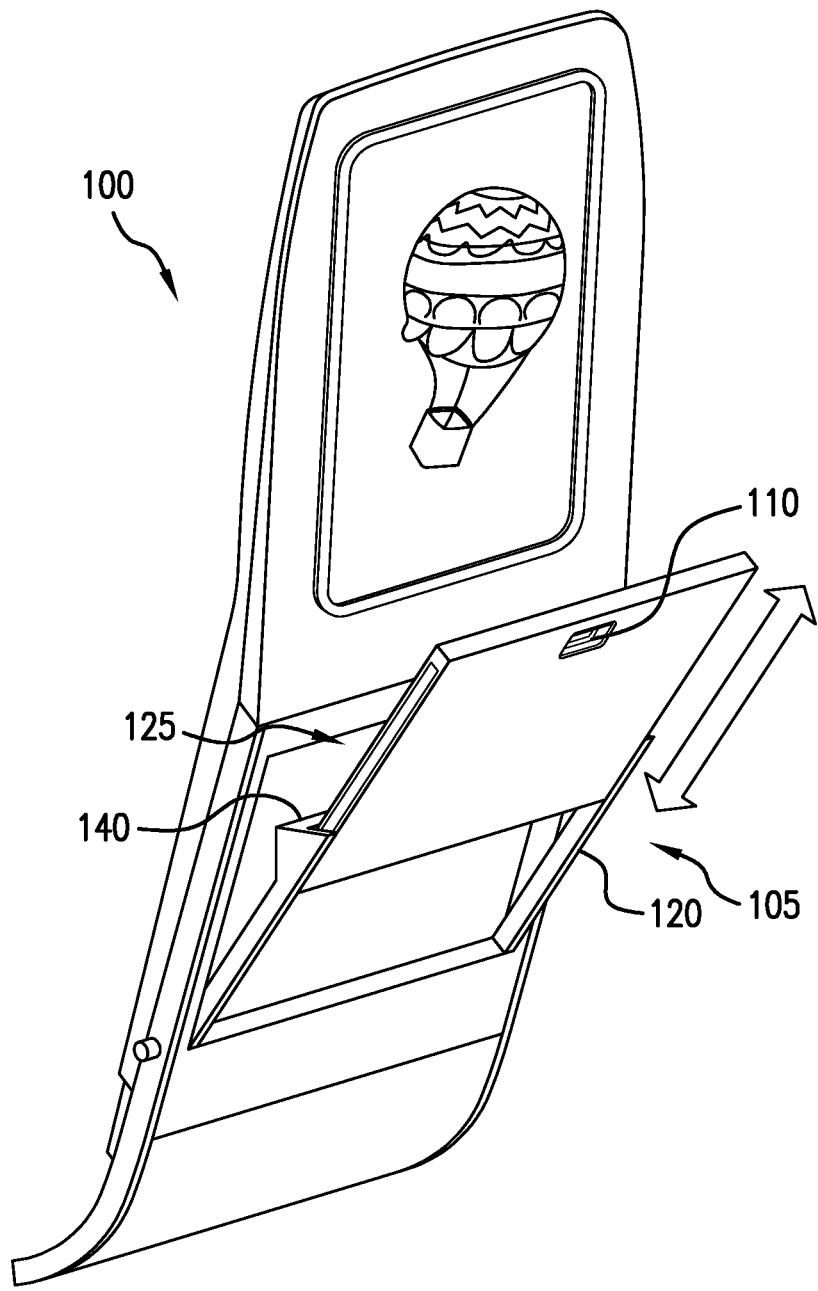
FIG. 1C depicts a perspective view of an aircraft seatback illustrating mid-deployment of an exemplary tray table.

FIG. 1C depicts a perspective view of the aircraft seatback 100 illustrating a mid-deployment position of the table assembly 105. The table support bracket 120, for example, may be slidably engaged to the tray table 125. The tray table 125, for example, slides longitudinally along the table support bracket 120 while moving from the mid-deployment position to a first operative (deployed) position.

Figure 1D:
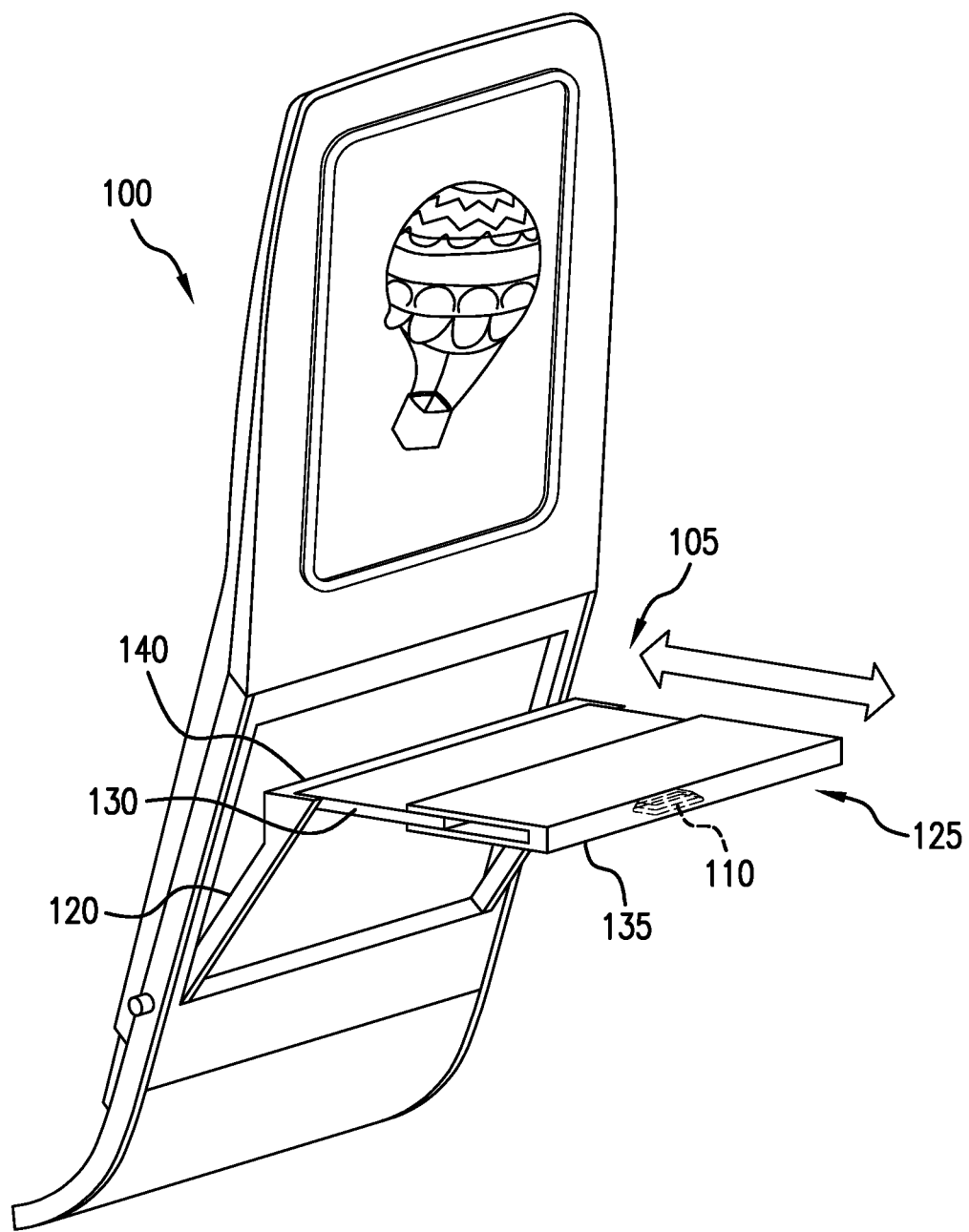
FIG. 1D depicts a perspective view of an aircraft seatback illustrating final deployment of an exemplary tray table.

FIG. 1D depicts a perspective view of an aircraft seatback illustrating a final deployment (first operative position) of an exemplary tray table. In operation, when the tray table 125 has slid along the table support bracket 120 and reached its highest extent, the tray table 125 is capable of pivoting to a substantially horizontal, deployed, position. In the first operative position, the tray table 125, as illustrated, is proximate to or abuts an upper cross member 140 of the support bracket 120.

In some implementations, as illustrated in FIG. 1D, the tray table 125 may be articulable to a second operative position through extending an outer table portion 135 away from an inner table portion 130. For example, the inner table portion 130 may be slidably engaged to the table support bracket 120, while the outer table portion 135 is slidably engaged to the inner table portion 130. The outer table portion may further be slidably engaged to the release mechanism110. In some embodiments, the release mechanism 110 may be spring-loaded. In operation, the inner table portion 130 and the outer table portion 135 slide in a longitudinal, coplanar relationship to one another. In an illustrative example, the longitudinal sliding action telescopes the tray table 125 into a larger table surface.

In other embodiments, rather than an outer table portion 135 and an inner table portion 130, two table portions may stack in stowing, and slidably extend away from each other upon deployment. An extension mechanism for slidably deploying parallel table portions, for example, is discussed in U.S. application Ser. No. 15/234,684 entitled "Telescoping Aircraft Panel Door" by B/E Aerospace, Inc., filed Aug. 11, 2016, which is hereby incorporated by reference in its entirety. A side-by-side telescoping tray table, for example, may avoid introduction of bacteria into an inner pocket surface of the outer table portion, for example due to food material left on the inner table portion transferring to the interior surface of the outer table portion.

In some implementations, the passenger may maintain the tray table 125 in collapsed position, with the inner table portion 130 substantially enclosed within the outer table portion 135 (e.g., a "first operative position"). In the first operative position, for example, the passenger may set a beverage and/or small personal electronic device on the outer table section 135 while retaining additional leg and lap space for activities such as crossing his or her legs or holding an infant.

In some embodiments, the table assembly 105 may include a lightweight pocket, in which, for example, an aircraft safety information card may be placed. For example, a bottom surface of the outer table section 135 may include a narrow, lightweight pocket configured to retain aircraft safety materials whether in the stowed position or in the horizontal, deployed position. In another example, a wide and shallow pocket may be mounted between the tray table assembly 105 and the display 115. In a further example, a wide and shallow pocket may be disposed beneath the mounting bracket 120 of the tray table assembly 105.

In some embodiments, safety information is distributed in an electronic format upon the display 115, advantageously substituting for the physical aircraft safety information card, and saving airlines the cost of printing and distributing aircraft safety information. In such embodiments, a dedicated safety display control may be disposed within reach of the passenger, and may have a dedicated predetermined function to present aircraft safety information. For example, aircraft safety information may be presented in slideshow or e-reader format upon the display 115. Selection of the dedicated safety display control, for example, may function to preempt any video programming in progress. Further, in one example, a passenger may progress through the slideshow by subsequent presses of the dedicated safety display control. The dedicated safety display control, in one example, may be displayed upon the display area 115 as a touch screen virtual control. In another example, the dedicated safety display control may be integrated into a remote control device accessible to the passenger, for example within an armrest control configuration. In a third example, the safety control may be integrated into a shroud region surrounding the display area 115, for example in a region below the display area 115 and above the foldaway tray table assembly 105.

In some embodiments, safety information may be available in a number of selectable languages, providing multilingual presentation of information to international travelers. For example, the display 115 may be a touch display including selectable controls associated with a number of world languages for presenting aircraft safety information as well as, optionally, additional airline marketing and informational materials.

In some embodiments, the larger area above the foldaway table assembly 105 may advantageously be employed to hold a portable electronic device (PED). In such examples, small retaining features may be fixedly coupled to the back of the aircraft passenger seat 100, such as, diagonally attached elastic straps in four places, holding the corners of a PED. In some examples, the PED may be slid into a three-sided frame. The three-sided frame may be articulably adjustable to suit the passenger's PED size. In some examples, the frame may be two-sided with a bottom stop feature.

In some embodiments, a PED holder on the back of the aircraft passenger seat 100 as described may be employed over the top of an original airline supplied display. Further a deployable protective sheet may be pulled over the top of the display 115 to prevent damage to both the display 115 and the passenger's PED.

In an illustrative example, the display 115 may be removably coupled to a display docking station. In such examples, the display 115 may be tethered to an electrical display harness. In some examples, the removably coupled display 115 may be reversibly docked such that the back side of the display 115 may employ an alternate feature, for example, a mirror.

In some examples, the additional space provided by the lower position of the foldaway table assembly 105 may allow employment of a lighting fixture. The lighting fixture may provide a more direct light onto a passenger's subject matter on the foldaway table assembly 105, or on a passenger's lap.

In some embodiments, the foldaway table assembly 105 may be provided without the outer sleeve 135. In such embodiments, the inner table portion 130 may provide the entire table surface. Further, the inner table portion 130 may be designed without the added sliding unlatching features. Such embodiments may not gain the advantage of as much space above the foldaway table assembly 105, however airlines may realize enough upper space advantage of the mere lowering of the foldaway table assembly 105, and may trade off some of the upper space for a larger but less complex and more cost-effective table assembly.

In some examples, the telescoping table segments may be employed as three or more table segments which may advantageously provide smaller tables surfaces in the stowed state, and/or larger tables surfaces in the deployed state. Such smaller tables surfaces in the stowed state may advantageously provide even larger available space in the upper portion of the back of the aircraft passenger seat 100.

Figure 2A:
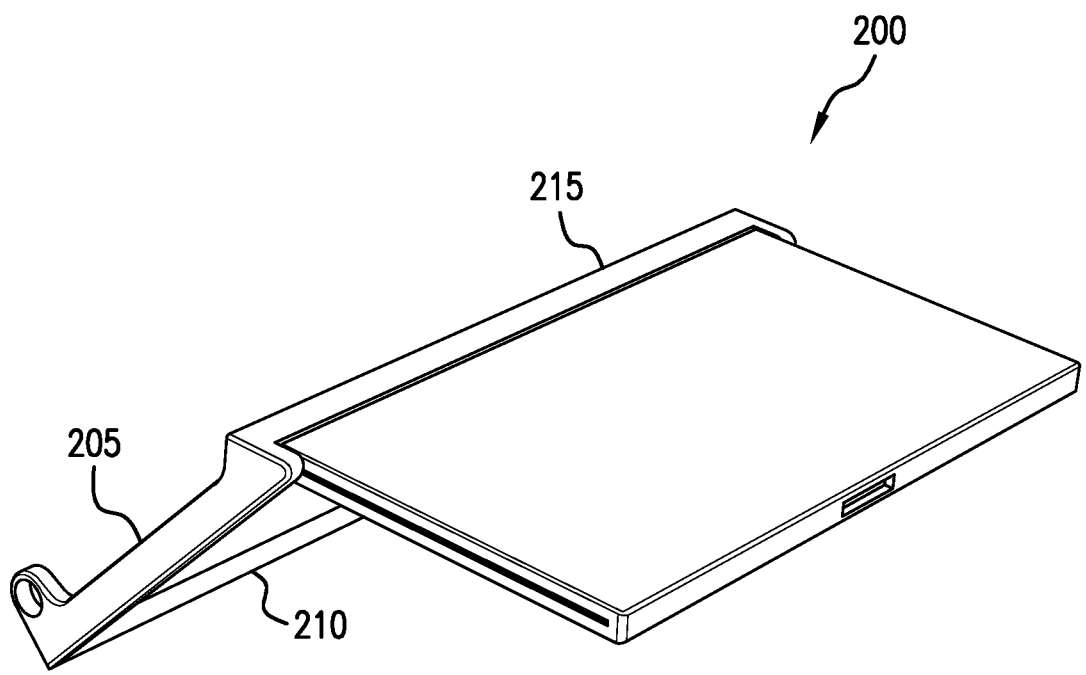
FIG. 2A depicts a perspective view of an exemplary aircraft collapsible table before table extension.

FIG. 2A depicts a perspective view of an exemplary aircraft collapsible table before table extension. A collapsible table assembly 200 includes a table support bracket 205. The table support bracket 205 includes a lower cross member 210 and an upper cross member 215. The collapsible table assembly 200 is depicted in mid-deployment, after the collapsible table assembly 200 was unlatched from a seatback, and the table surface portion was slid vertically to its fullest extent, then pivoted to a horizontal position.

Figure 2B:
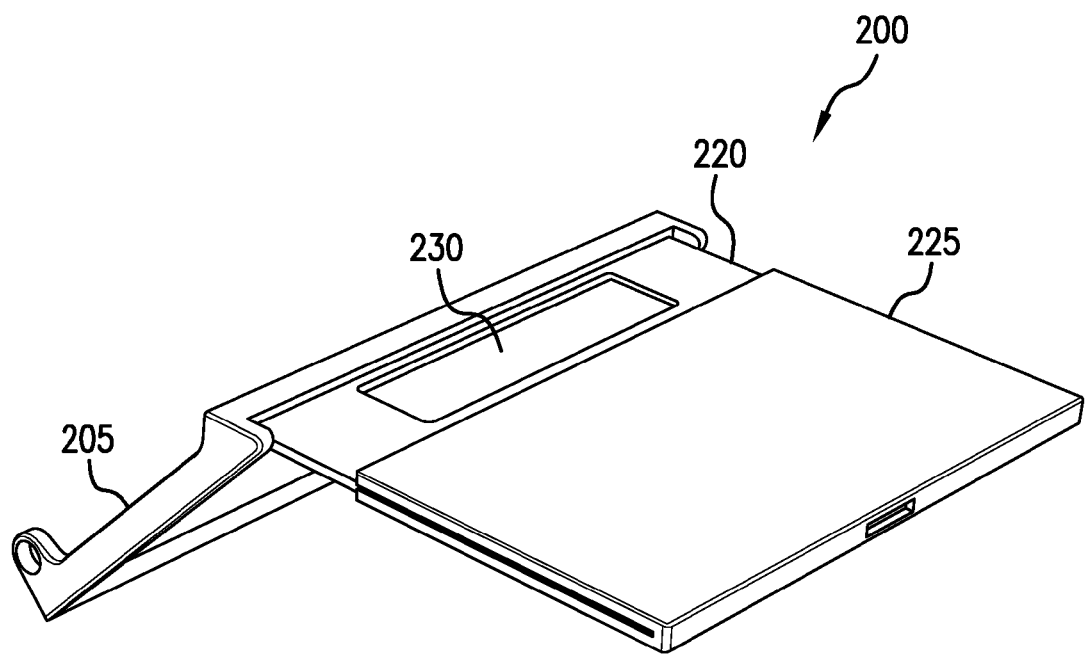
FIG. 2B depict a perspective view of an exemplary aircraft collapsible table after table extension.

FIG. 2B depicts a perspective view of an exemplary aircraft collapsible table after table extension. The collapsible table assembly 200 includes the table support bracket 205. The table support bracket 205 is hingedly coupled to an inner table portion 220. The table inner core 220 is slidably engaged to a table portion 225. The inner table portion 220, in one example, is an extension bracket for moving the table portion 225 closer to a passenger (e.g., in a second operative position), for example to provide the passenger with an eating surface. In another example, the inner table portion 220 is an additional table section. For example, an aperture (or depression) 230 may be an electronic device retaining surface, electronic device wireless charging surface, or writing utensil retaining surface. In other embodiments, the aperture 230 may instead be formed as a beverage receiving inset within the surface of the inner table portion 220.

Further, the sliding action may uncover additional features within the inner table portion 220. For example, the inner table portion 220 may include additional embossed features (e.g., pencil holder, cup holder). In some examples, a mirror may be embossed into the inner table portion 220. The mirror may pop up an angle toward the passenger's face which may advantageously provide passengers a vanity mirror feature.

In some examples, a slot extending laterally across the top surface of the inner table portion 220 may be incorporated which may provide a location to place a PED and may advantageously provide hands-free employment of the PED. Further, the collapsible table assembly 200 may be provided with a friction hinge and may provide viewing angle adjustment for an employed PED.

In some examples, lighting may be provided with in the collapsible table assembly 200. For example, a bendable LED lighting fixture may be provided on one or both sides of the collapsible table assembly 200. The lighting fixtures may be fixedly coupled to the table support brackets 205. The lighting fixtures may advantageously provide direct lighting of passenger's subject matter on the collapsible table assembly 200.

In some embodiments, a PED charging receptacle may be provided on the collapsible table assembly 200. In some examples, the charging receptacle may be a USB port. Passengers may find a benefit of having a charging port directly on the table surface where the PED may reside.

In some embodiments, the outer table portion 225 may include embossed features, for example, a cup holder. Further, the embossing may be raised or may be indented. In some examples, the corners of the collapsible table assembly 200 may be chamfered, which may advantageously provide a snag free passage.

In some examples, lateral slides with table wings may be provided from the table inner table portion 220. The lateral slides may interlock with adjacent passenger seats. The lateral slides may advantageously provide for a wider work surface and/or a collaborative work surface. In some examples, the sides of the table may fold open like a book.

In an illustrative example, the table support bracket 205 may be provided with a deployment angle adjustment lever.

Such an angle adjustment lever may be, for example, incorporated as a slide lever with in the table support bracket 205.

In some embodiments, the lateral edges of the collapsible table assembly 200 may wrap around from top surface to bottom surface which may advantageously provide a barrier such that objects may not be forced into the sides of the outer table portion 225. The continuous surface from top to side to bottom of the outer table portion 225 may advantageously disallow passengers from forcing objects (e.g., coins, bobby pins, chewing gum) into the collapsible table assembly 200.

In some embodiments, the front edge of the outer table portion 225 facing the passenger may be rounded, which may advantageously provide passengers sharp corner protection.

In some situations, a passenger may desire a shallower table assembly. Therefore, in some examples, the featured sliding action of the outer table portion 225 from the inner table portion 220 may not be employed by the passenger. In such examples, the table release latch 305 may be additionally employed as a release mechanism for the outer table portion 225 from the inner table portion 220. Further, a passenger may decide to keep the outer table portion 225 fully engaged with and not slid out from the inner table portion 220. The passenger may benefit from the table release latch 305 holding the two tables surfaces (the outer table portion 225 and the inner table portion 220) together such that the work surface stays together during passenger use.

In an illustrative example, the bottom of the outer table portion 225, which faces the passenger when stowed, may be employed as an advertisement space. In such examples, an advertisement may be molded into the bottom of the outer table portion 225. In some examples, the bottom of the outer table portion 225 may contain a transparent envelope. In these examples, various advertisements may be displayed within the transparent envelope which may advantageously provide airlines with a potential revenue stream. Further in these examples, certain advertising of airline specials may be displayed, for example, food or drink specials, as are commonly displayed on tables at restaurants.

In some embodiments, the table portion 225 may include an integrated lateral side lip on the top and bottom surface of each lateral side. The integrated lateral side lip may hold the outer table portion 225 laterally onto the inner table portion 220. In operation, the outer table portion 225 may slide away from the center of the table assembly 200, which may advantageously provide a larger table surface.

Figure 3:
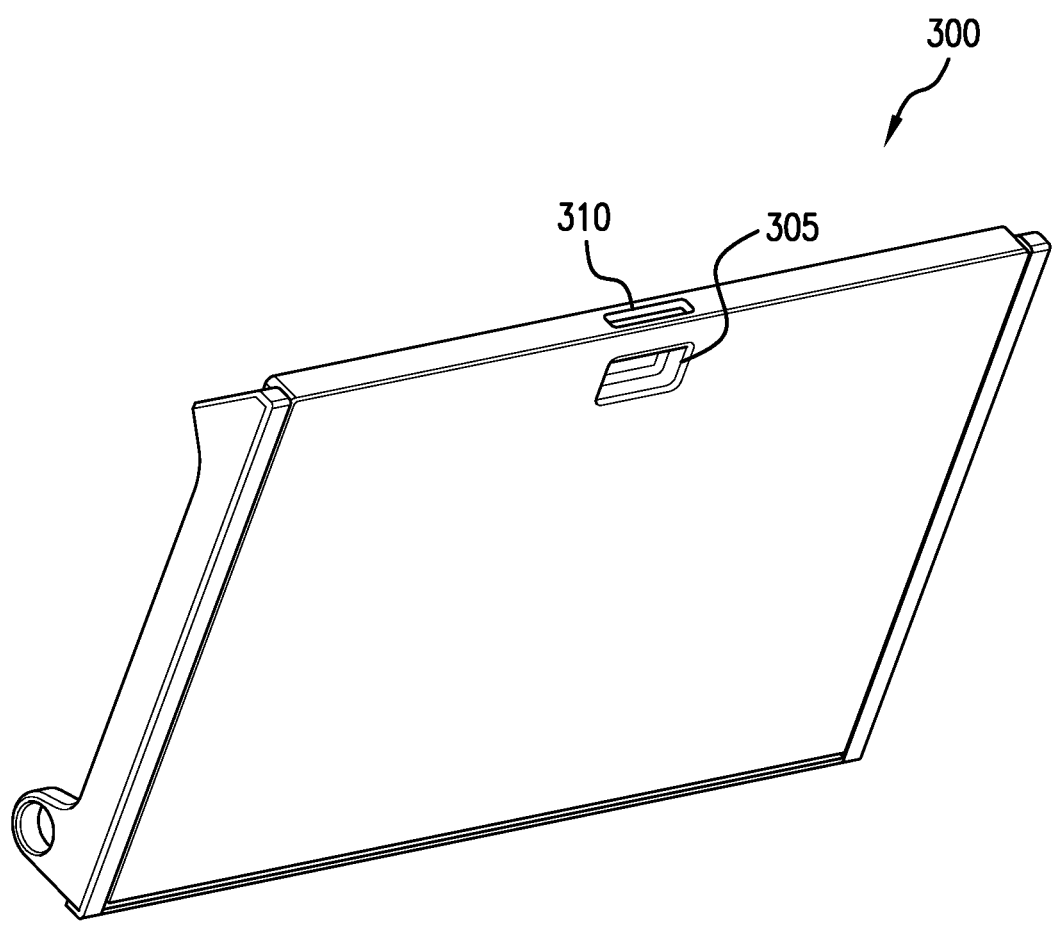
FIG. 3 depicts a perspective view of an exemplary release latch incorporated within a collapsible aircraft table.

FIG. 3 depicts a perspective view of an exemplary release latch incorporated within a collapsible aircraft table. A aircraft table assembly 300, in some embodiments, includes a table release latch 305. The aircraft table assembly 300 may also include a spring-loaded outer sleeve slot 310. In operation, a user may articulate the table release latch 305, pulling or pressing down with a finger. The articulated table release latch 305 may release the collapsible aircraft table 300 from it stowed position.

Figure 4:
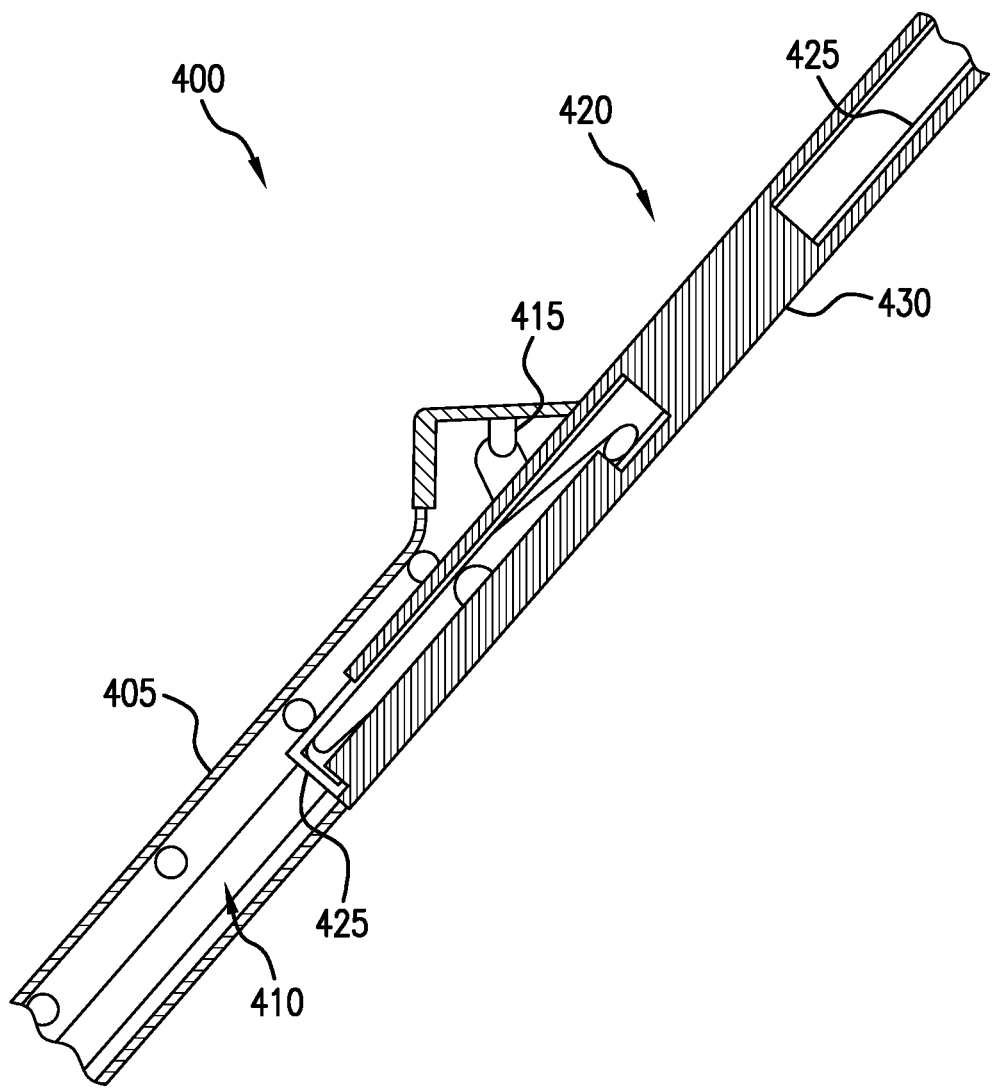
FIG. 4 depicts a cross-sectional elevation view of an exemplary aircraft deployable personal table, illustrating a rocker latch mechanism.

FIG. 4 depicts a cross-sectional elevation view of an exemplary aircraft deployable personal table, illustrating a rocker latch mechanism. In FIG. 4 an aircraft deployable personal table assembly 400 includes a table support bracket 405. The table support bracket 405 includes a slide rail groove 410 and an unlatching pin 415. The slide rail groove 410 slidably engages a telescoping table assembly 420. The telescoping table assembly 420 includes an inner table 425 and an outer table 430.

In an illustrative example, the slide rail groove 410 may be lubricated with a plastic coating. The coating may prevent metal on metal scratching noises without the need for regular lubrication maintenance.

Figure 5:
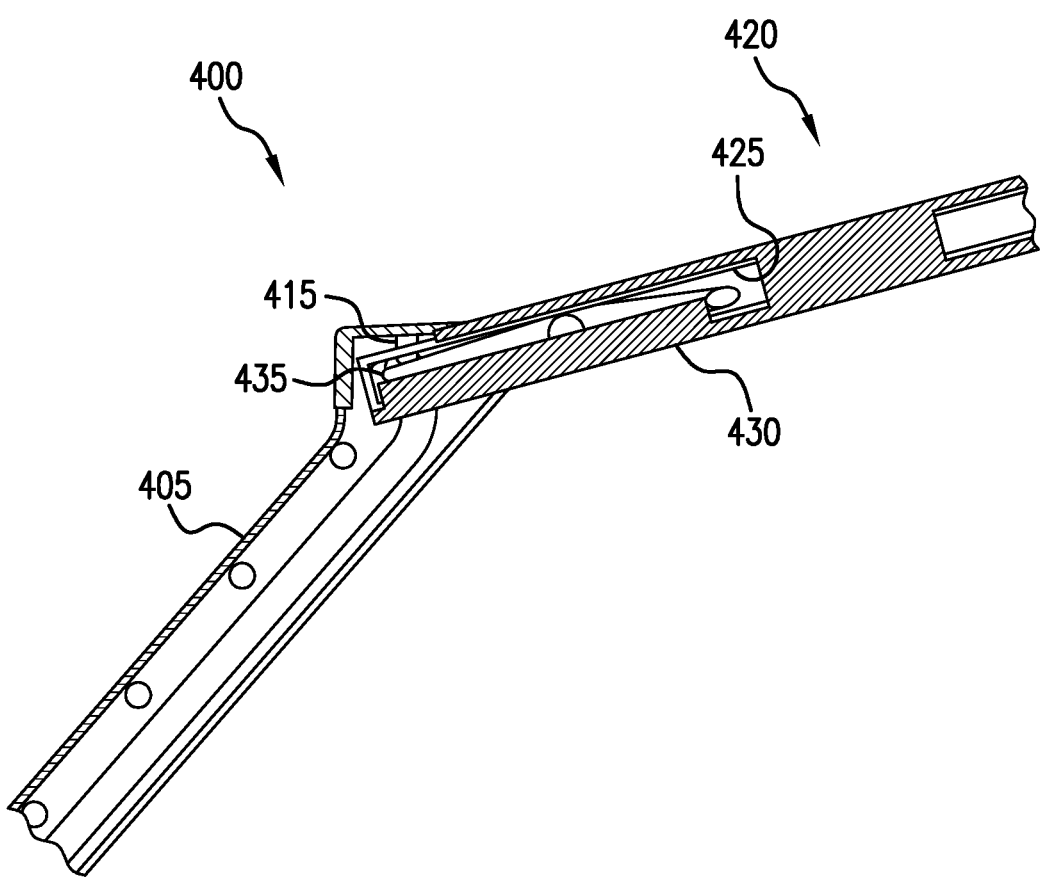
FIG. 5 depicts a cross-sectional elevation view of an exemplary aircraft deployable personal table, illustrating the incipient engagement of an unlatching pin.

FIG. 5 depicts a cross-sectional elevation view of an exemplary aircraft deployable tray table, illustrating the incipient engagement of an unlatching pin. The tray table assembly 400 includes an outer table portion 420, and an inner table portion 425 configured for telescoping extension. The inner table portion 425 may include a rocker latch 435. In operation, as the outer table portion 420, containing the inner table portion 425 is articulated toward a horizontal state, the unlatching pin 415, held by the table support bracket 405, enters the inner table portion 425 via an aperture (not shown). Further, the incipient entry of the unlatching pin 415 into the inner table portion 425 begins to force a far end of the rocker latch 435 downward. The downward action of the far side of the rocker latch 435 begins to force a nearside of the rocker latch 435 upward.

Figure 6:
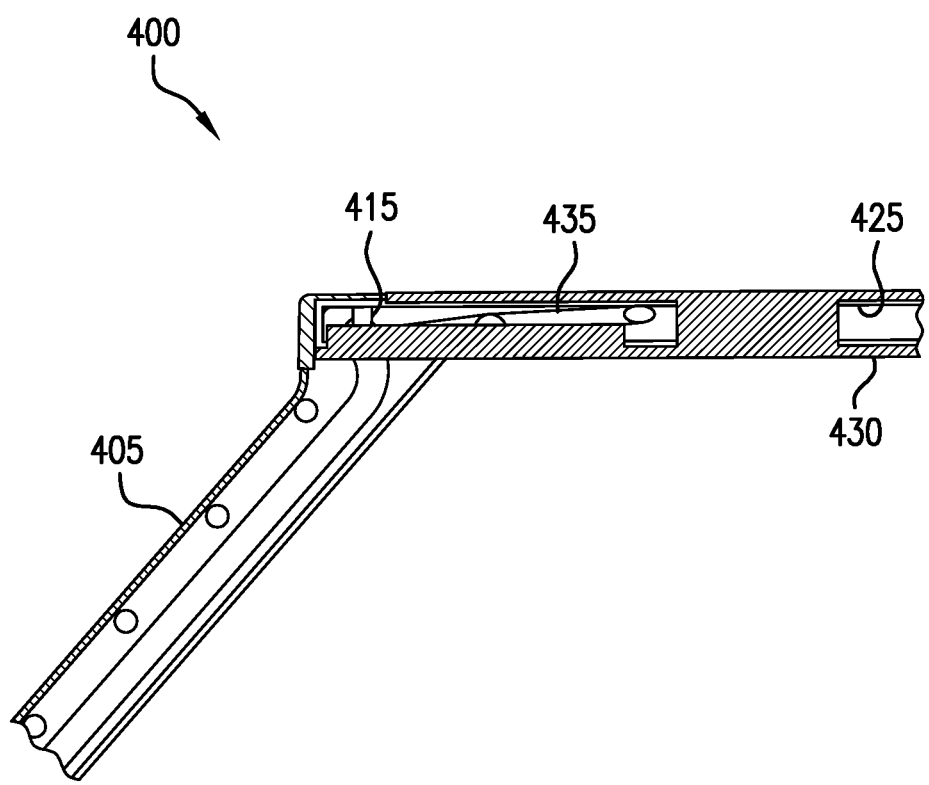
FIG. 6 depicts a cross-sectional elevation view of an exemplary aircraft deployable personal table, illustrating the full engagement of an unlatching pin.

FIG. 6 depicts a cross-sectional elevation view of an exemplary aircraft tray table, illustrating the full engagement of an unlatching pin. The aircraft tray table assembly 400 is depicted articulated fully in the horizontal state. The unlatching pin 415 fully enters the inner table portion 425 via the aperture (not shown). Further, the unlatching pin 415 forces the far end of the rocker latch 435 fully downward. The fully downward action of the far side of the rocker latch 435 forces the near side of the rocker latch 435 fully upward. The fully upward action of the near side of the rocker latch 435 releases the captured outer table portion 430 allowing a telescoping action of the outer table portion 430 away from the inner table portion 425 and the table support bracket 405 and toward a passenger, which may advantageously increase the table surface made up of the inner table 425 and the outer table 430 by up to 100 percent.

In some embodiments, one or more limit pins may be fixedly coupled to the table support bracket 405. The limit pins may be located just below or just above the personal table assembly 400 when in its horizontal position, substantially normal to the longitudinal axis of the table support bracket 405, and substantially horizontal to the floor. The limit pins may hold the personal table assembly 400 into its final horizontal position, limiting further motion rotating downward as the personal table assembly 400 is deployed. In some embodiments, the limit pin may take the form of a motion limiting stop-ledge protruding out of the table support bracket 405, for example, and limits the motion of the personal table assembly 400 from rotating further downward from horizontal.

In some embodiments, the rocker latch 435 may be spring-loaded, biased in the latched position, clockwise with respect to FIG. 4, for example. In operation, this spring-loaded bias may prevent the outer table 430 from deploying when the personal table assembly 400 is not in the deployed horizontal position.

In some examples, the rocker latch 435 may be lengthened to allow longer telescoping action of the outer table 430. In such examples, the operable surfaces related to the rocker latch 435 within the outer table 430 may be lengthened as well to allow longer telescoping action.

In some embodiments, the rocker latch 435 may terminate with a roller assembly, on the opposite side that is pressed by the unlatching pin 415. The roller assembly may provide a low-wear design, and may advantageously require less maintenance.

In some embodiments, the table support bracket 405 may be milled from a block of aluminum. Such milling may provide substantial strength to the table support bracket 405. In some examples, the table support bracket 405 may be assembled from multiple parts. Such a composite assembly may provide a cost advantage.

Figure 7:
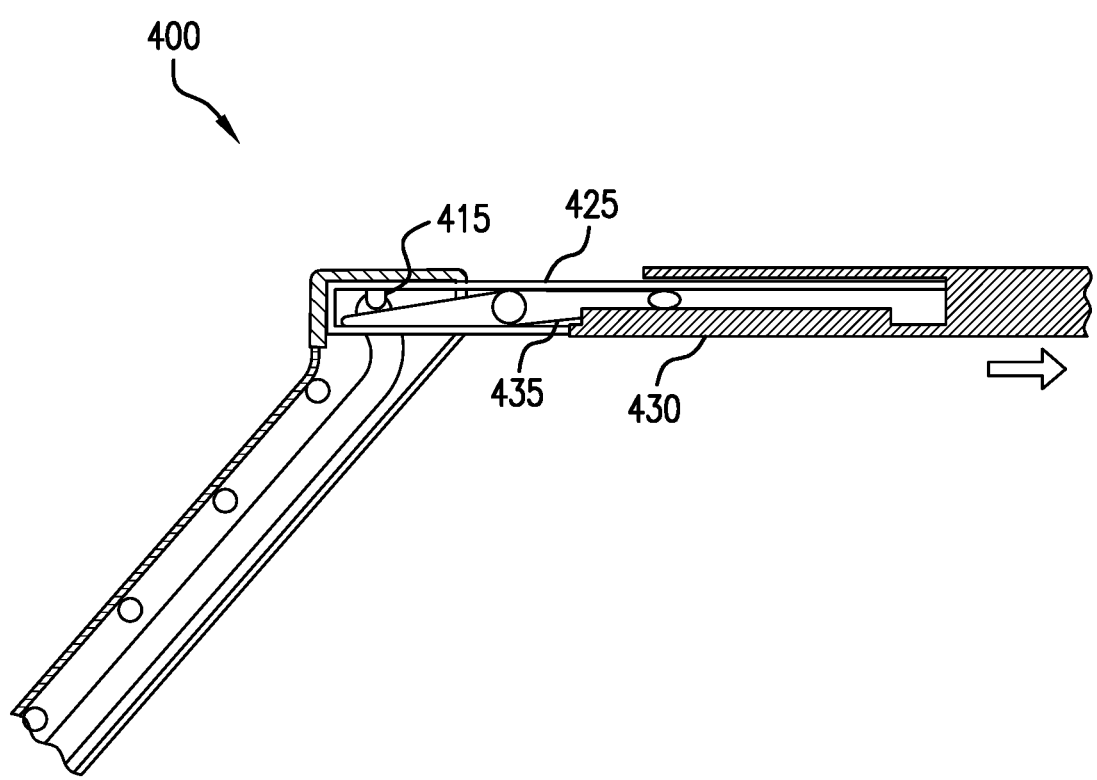
FIG. 7 depicts a cross-sectional elevation view of an exemplary aircraft deployable personal table, illustrating deployment of unlatched table surfaces.

FIG. 7 depicts a cross-sectional elevation view of an exemplary tray table assembly, illustrating deployment of unlatched table surfaces. The tray table assembly 400 is depicted articulated fully in the horizontal state, and sliding open toward a passenger. The tray table assembly 400 includes the unlatching pin 415. The unlatching pin forces the rocker latch 435 counterclockwise with reference to FIG. 7. The rocker latch 435 releases the outer table 430. The released outer table 430 slides forward on the inner table 425 toward the passenger.

In some embodiments, detents may be provided within the outer table portion 430 and/or the inner table portion 425. In operation, a passenger may deploy the tray table assembly 400 to the horizontal position, then begin sliding the outer table portion 430 to extend the table surface area. When the outer table portion 430 reaches its maximum extent, mechanical detents may provide a temporary slide stop. In such an embodiment, incidental bumping of the tray table assembly 400 may not cause the outer table portion 430 to begin collapsing. When the passenger pushes longitudinally with substantial and intentional force, the detents may be overcome and the tray table assembly 400 may be collapsed.

In some embodiments, the sliding action between the outer table portion 430 and the inner table portion 425 may be spring-loaded. The spring-loaded mechanism may advantageously aid passengers with deployment of the tray table assembly 400. In some examples, the sliding action may be spring-loaded and dashpot-retarded, such during deployment, upon the table subassembly (the outer table portion 430 substantially encompassing the inner table portion 425) reaching its horizontal position, the unlatching pin 415 may release the rocker latch 435 and release the outer table portion 430, which may move autonomously toward the passenger.

Figure 8:
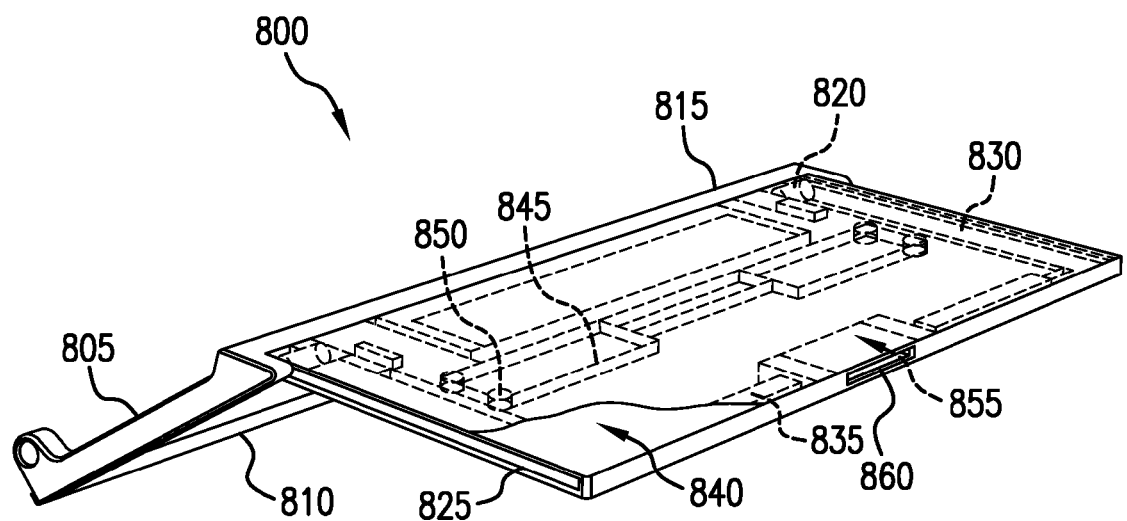
FIG. 8 depicts a perspective view of an exemplary aircraft deployable personal table illustrating its internal configuration.

FIG. 8 depicts a perspective view of an exemplary aircraft deployable tray table assembly illustrating its internal configuration. A tray table assembly 800 includes a support/side frame structure 805. The support/side frame structure 805 is fixedly coupled to a lower cross member 810, and an upper cross member 815. The support/side frame structure 805 is hingedly coupled to a hinge pin 820. The hinge pin 820 is fixedly coupled to an inner table portion 825. The inner table portion 825 is fixedly coupled to a slide block 830. The inner table portion 825 is fixedly coupled to a stop block 835. The inner table portion 825 is slidably engaged with an outer table portion 840. The outer table portion 840 is fixedly coupled to ribbing structures 845. In operation, as the outer table portion 840 slides toward the user, the ribbing structures 845 are stopped by the stop blocks 835. Since the ribbing structures 845 are fixedly coupled to the outer table portion 840, and the stop blocks 835 are fixedly coupled to the inner table portion 825, the sliding motion between the outer table portion 840 and the inner table portion 825 is terminated. The ribbing structures 845 are rotatably coupled to a guide wheel 850. In operation, as the outer table portion 840 slides relative to the inner table portion 825, the guide wheel 850 keeps the outer table portion 840 substantially parallel with the inner table portion 825, which may advantageously avoid binding. The outer table portion 840 is slidably coupled to a latch block 855. The latch block 855 includes an outer sleeve slot 860. The latch block 855 includes a table release latch (such as FIG. 3 reference 305).

The latch block 855 is spring-loaded, such that in operation, the latch block 855 sits in a detent position flush with the front edge of the outer table portion 840.

In some embodiments, the latch block 855 may contain a mechanism that forces a latching shaft out its sides, and may advantageously interfere with the stop blocks 835 to prevent the inner table portion 825 from sliding with relationship to the outer table portion 840. In such an embodiment, activating a table release latch (such as FIG. 3 reference 305) away from the center of the tray table assembly 800 may retract the latching shaft back into the latch block 855, and may release the outer table portion 840 to slide freely.

In some embodiments, where a PED is employed within a groove on the tray table assembly 800, the table release latch block 855 may be employed to release a hinge stop mechanism to allow the tray table assembly 800 to hinge below horizontal and may provide extended viewing angle adjustment for the employed PED.

In an exemplary embodiment, the bottom side of the outer table portion 840 may include a small aperture near the hinge pin 820. In this example, maintenance personnel may employ a mechanical key within the aperture to release the table subassembly of the tray table assembly 800 from the support/side frame structure 805. Maintenance personnel may find an advantage in the ability to replace the table subassembly as a field replaceable unit (FRU). Maintenance of equipment existing as FRUs may provide convenience and speed benefits.

In some embodiments, the lateral sides of the outer table portion 840 may include a servicing tab which when employed may release the outer table portion 840 completely from the inner table portion 825. Such a release mechanism may provide benefit in freeing the table portions 825 and 840 from each other, or to provide preventative maintenance to the tray table assembly 800.

In some examples, certain portions of the tray table assembly 800 may employ a fabric such as felt or various soft materials such as a foam material to reduce rattling. The reduction of rattling may provide a quieting benefit within an aircraft vibrating from various engines.

In some examples, various gaskets may be employed within portions of the tray table assembly 800. The gaskets may advantageously provide a seal from spilled beverages or food from making an ingress into the inner portions of the tray table assembly 800. For example a "squeegee" edge may be provided on at least an upper service of the outer table portion 840 to scrape excess material off of the upper surface of the inner table portion 825 upon collapsing the table portions 825, 840.

Figure 9A:
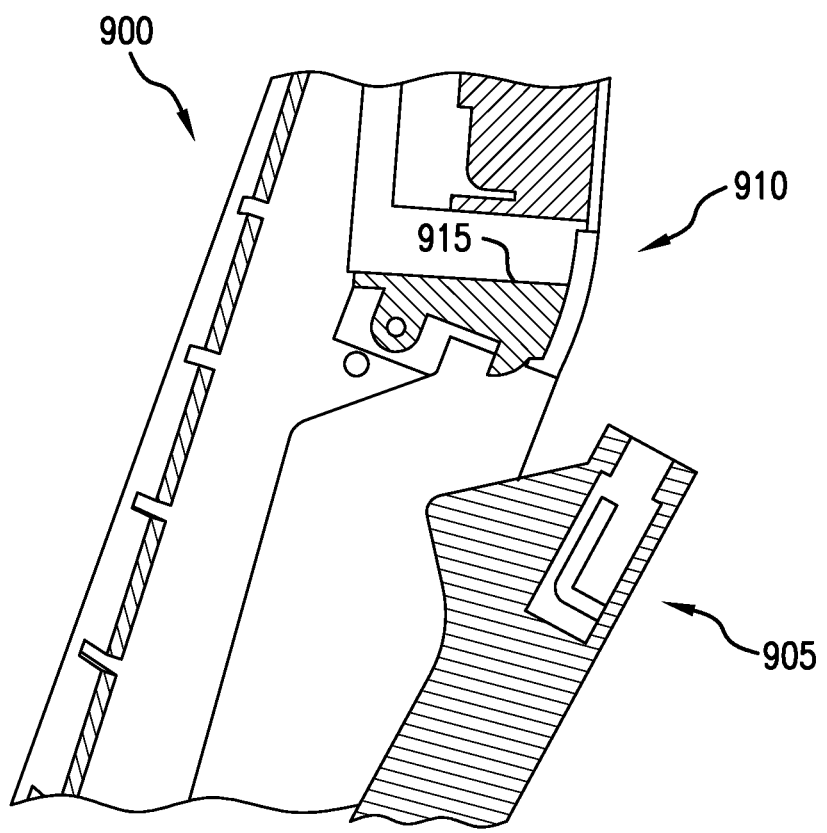
FIGS. 9A, 9B, 9C and 9D depict cross-sectional elevation views of an exemplary docking cradle coupled to a seatback in various stages.
Figure 9B:
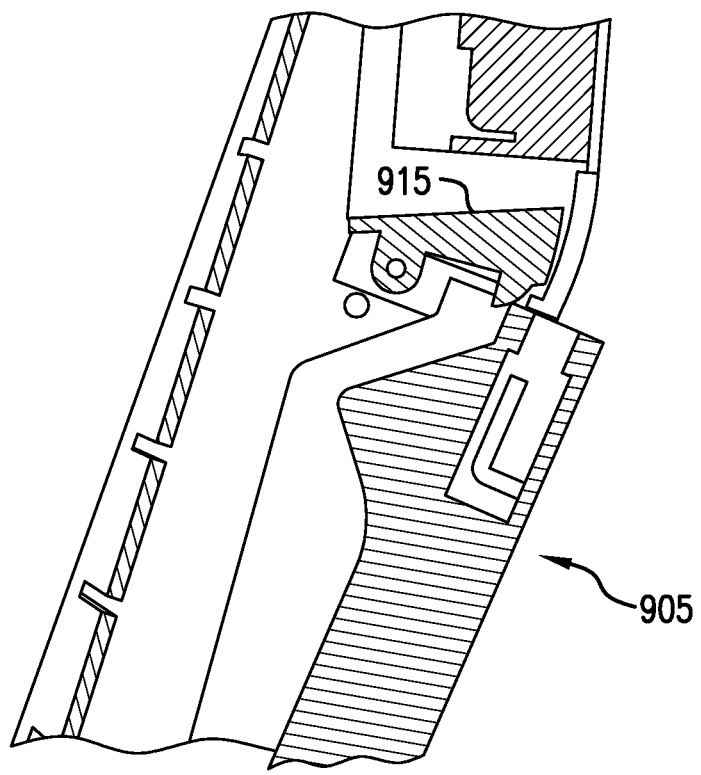
Figure 9C:
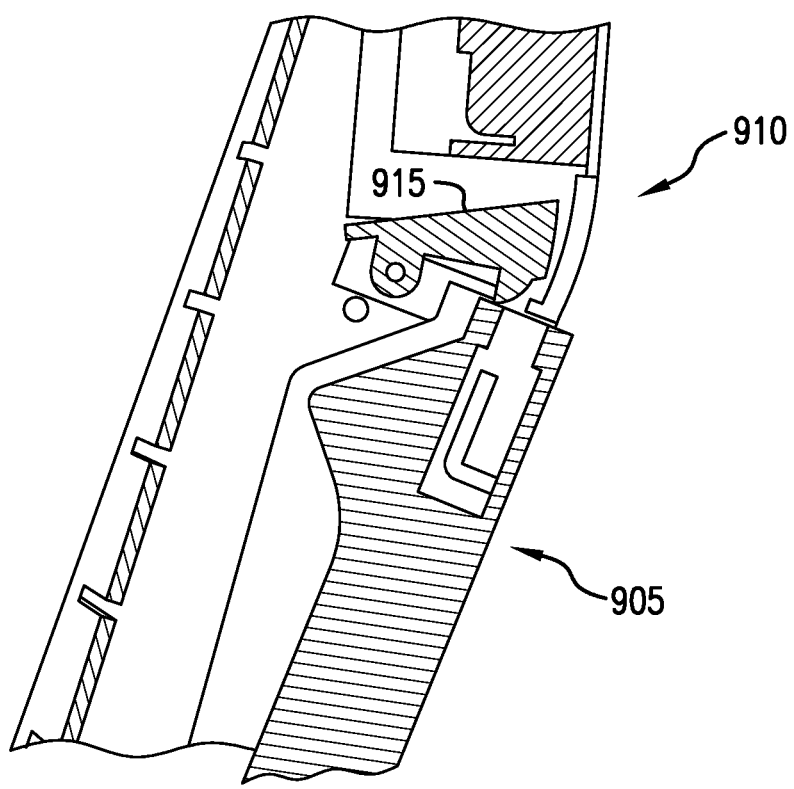
Figure 9D:
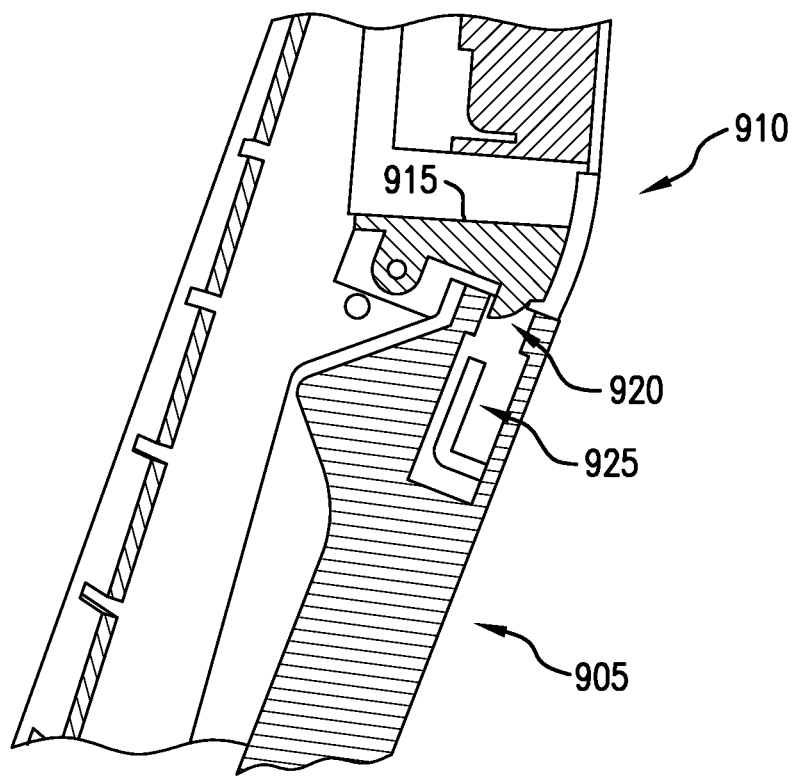

FIGS. 9A, 9B, 9C and 9D depict cross-sectional elevation views of an exemplary docking cradle coupled to a seatback in various stages. In FIG. 9A, a cut-away portion of a tray table assembly 900 includes a table assembly section 905. The table assembly section 905 is coupled to a docking cradle 910. In some examples the coupling may be releasable. The docking cradle 910 is hingedly coupled to a spring-loaded retaining latch 915. In FIG. 9B, the table assembly section 905 is hinged away from a user (toward the seatback) until it contacts the spring-loaded retaining latch 915. In FIG. 9C, the user forces the table assembly section 905 into the docking cradle 910, which forces the spring-loaded retaining latch 915 upward in and away from the table assembly section 905. As the user continues to force the table assembly section 905 into the docking cradle 910, as depicted in FIG. 9D, the spring-loaded retaining latch 915 springs into a tray retention slot 920. The table assembly section 905 is now retained in the docking cradle 910, until a downward pull is applied to a spring-loaded release mechanism 925. When the spring-loaded release mechanism 925 is forced downward, the spring-loaded retaining latch 915 no longer retains the table assembly section 905, such that the table assembly section 905 is free to swing out and be deployed.

In some embodiments, the release mechanism may permit a user to articulate the latch block (FIG. 8, reference 855) outward and away from the center of the outer table portion (FIG. 8, reference 840), to unlatch the outer table portion (FIG. 8, reference 840) from the inner table portion (FIG. 8, reference 825). Further, the release mechanism may also permit a user to articulate the latch block (FIG. 8, reference 855) inward and toward the center of the outer table portion (FIG. 8, reference 840), to unlatch the table assembly 905 from the docking cradle 910.

In some embodiments, the release mechanism 925 may not be spring loaded. In such embodiments, the spring-loaded retaining latch 915 within the docking cradle 910 may be additionally provided with an integral release mechanism. In operation, the release mechanism may be actuated in an upward direction by a passenger to release the table assembly section 905 for deployment.

In some embodiments, instead of a manually actuated unlatch, the latch 915 may employ a captured spring-loaded ball bearing. In operation, a user may stow the table assembly section 905, forcing it into the docking cradle 910 which may force the spring-loaded ball bearing upward and away from the table assembly section 905. As the user continues to force the table assembly section 905 toward the seatback, the spring-loaded ball bearing may spring into the tray retention slot 920.

In some embodiments, the latch 915 may not be spring loaded. In such embodiments, the depicted quarter—circle portion of the latch 915 entering the tray retention slot 920 may be a shallow oval shape, which may allow the tray retention slot 920, which is part of the spring-loaded release mechanism 925, to spring out-of-the-way for both entering stowage, and exiting stowage. Further, in such embodiments, the release mechanism 925 may employ additional cavities for the passenger to pull the table assembly 905 out of its deployed state. In such embodiments, the table assembly 905 retention works as a detent.

Although various embodiments have been described with reference to the figures, other embodiments are possible. For example, in some embodiments, a sliding release latch in the table may be spring-loaded forward to close out a slot in the front lip (facing the passenger) of the table when the table is deployed. The spring in the latch in the seatback which retains the table assembly into the seatback may be of a higher force and may push away the sliding latch in the table when the table is stowed.

In some embodiments, a tray table assembly may be stowed in a lower part of a seatback of an economy class aircraft seat, in a space that may traditionally be occupied by a literature/stowage pocket. The tray table assembly may be latched into the seatback in a stowed position and when unlatched may be free to rotate out into a raised, unlatched position. In operation, the table assembly, may be slid up along the slide rails on a table support mechanism and then rotated down into a horizontal position.

In some examples, a tray table assembly that is stowed in the lower part of a seatback may enable the upper area of a seatback to accommodate a much larger portrait format LCD screen. In some examples, the accommodation may permit employment of the maximum size of an LCD screen. In some examples, a newer, higher resolution version may be retrofit onto a seatback without a HIC test, if substantial similarity between the old and new can be demonstrated to the certifying authorities.

In some embodiments, a support/slide frame may hold the table assembly into the back of the seat in its stowed position and may hinge to deploy the table assembly into an unlatched position. The frame may encapsulate the sides and bottom of a table and may employ slide rails on each side to guide the table upward into its horizontal position. The slides may be designed to limit binding when the table assembly is being slid upward. The frame may also employ crossbars at the top and bottom, which may stabilize the table assembly across its width. In such embodiments, the top crossbar may hold a pin, which may actuate a linkage that enables the outer table portion of the table to be slid toward an aft-seated passenger when the table becomes fully horizontal.

In some examples, the inner table portion of the table may be the major supporting element in the horizontal unlatched position. For example, on each side of the inner table portion may be slides that may guide the table within the support/frame, when the table may be slid out within the frame. In some examples, pins may form an end-stop to the travel of the table, as it hinges into the horizontal position. In such examples, the end-stop pins may support the table in its final horizontal position when it is hinged downward into the horizontal unlatched position. The inner table portion of the table may also hold a pair of spring-loaded rocking latches which may unlatch the inner table portion from the outer table portion of the table when the subassembly is being slid out from its unlatched position. In some examples, when the table is in its horizontal position, an internal set of guide wheels may guide the outer table portion when it is being slid forward to extend the size of the table.

In some embodiments, an outer table portion may hold a spring-loaded latch, which may be used to release the table assembly from its stowed position. In such embodiments, the outer table portion may form the majority of the top, front, sides and underside of the table in its horizontal position. In an illustrative example, after the table is fully deployed into its horizontal position, a pair of hinging latches in the inner table portion may be pushed out of the way by the pins in the support/slide frame, enabling the outer table portion to be free to be pulled closer to a passenger.

In an illustrative example, the outer table portion may automatically interlock with its inner table portion when it is slid up from the unlatched to deployed position. In this example, the frame may include a cross bar at the top and bottom which may stabilize it across its width, and the top crossbar may hold a pin which may actuate a linkage that may enable the outer table portion to be slid forward, toward the passenger, when the table becomes fully horizontal, to provide extended longitudinal depth.

In some implementations, a tray table may be stowable in a lower portion of a seatback of an aircraft seat, the table having an inner table portion and a slidably engaged outer table portion, the table also incorporating an automatic table slide release mechanism, releasing the outer table portion from the inner table portion, allowing extension in a coplanar fashion, the table also having lateral slide rails to guide the inner table portion upward from a lower stowed position into a raised horizontal position, the table assembly further including a stowing dock with a latch, operable to retain the table in a stowed position. In an illustrative example, the collapsible table may stow low on an aircraft seatback, providing a larger available space in the upper area of the seatback, which may accommodate an upgraded display technology, for example, a large portrait format display screen.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A passenger seat comprising:
    a tray table support bracket comprising:
        at least one support arm having a proximal end configured to hingedly couple to a passenger seatback, the at least one support arm operable to pivot between a stowed position in which a distal end of the at least one support arm is oriented to be substantially parallel to the seatback, and a deployed position in which the distal end of the at least one support aim is displaced away from the seatback,
        a guide member extending between the distal end and the proximal end of the at least one support arm; and
        a rocker actuator disposed at the distal end of the at least one support arm;
    a tray table coupled to the tray table support bracket and configured to provide a substantially horizontal work surface when in a deployed state, the tray table comprising:
        a hinge base portion in a slidable engagement relationship with the guide member and being rotatably coupled to the at least one support arm about a lateral axis of rotation when the hinge base is positioned proximate to the distal end of the at least one support arm, and
        an extension portion configured to define a work surface, the extension portion being in a controlled slidable engagement relationship with the hinge base portion; and
    a rocker latch pivotably coupled to the hinge base portion and operable to pivot between a locked position corresponding to a partially deployed state of the binge base portion and an unlocked position corresponding to a fully deployed state of the hinge base portion;
    wherein the rocker actuator comprises a spring bias mechanism directed downward to engage a proximal end of the rocker latch in response to the hinge base portion rotating about the lateral axis of rotation toward the fully deployed state of the hinge base portion; and
    wherein when in the locked position, a distal end of the rocker latch engages and retains the extension portion in a retracted position relative to the hinge base portion, and wherein when in the unlocked position, the distal end of the latch disengages the extension portion such that the extension portion is free to slide distally relative to the hinge base portion, the latch being configured to automatically unlock responsive to the hinge base portion rotating about the lateral axis of toward the fully deployed state.

2. The passenger seat of claim 1, wherein, in the stowed position, a majority of the tray table is positioned below a deployment height of the tray table such that additional clearance is provided on the seatback above the tray table for one or more accessory items.

3. The passenger seat of claim 1, wherein the at least one support arm comprises two support arms that are each adapted to slidably engage opposite lateral sides of the tray table.

4. The passenger seat of claim 1, wherein the tray table is configured to be received in a recess defined in the seatback when the tray table support bracket is pivoted to the stowed position.

5. The passenger seat of claim 1, wherein the hinge base portion comprises at least one extension arm, and the extension portion is in telescoping engagement with the hinge base portion.

6. The passenger seat of claim 1, further comprising a seatback shroud, wherein the tray table support bracket is fixed to the seatback shroud, the seatback shroud further comprising a display aperture for receiving a display monitor positioned in portrait orientation.

7. The passenger seat of claim 1, wherein the display aperture is configured to releasably receive a display monitor having a diagonal size of at least 15 inches.

* * * * *